Nov. 8, 1960  B. T. JOHNSON  2,959,012
AUTOMOTIVE PULSATING BRAKE CONTROL APPARATUS
Filed April 2, 1956
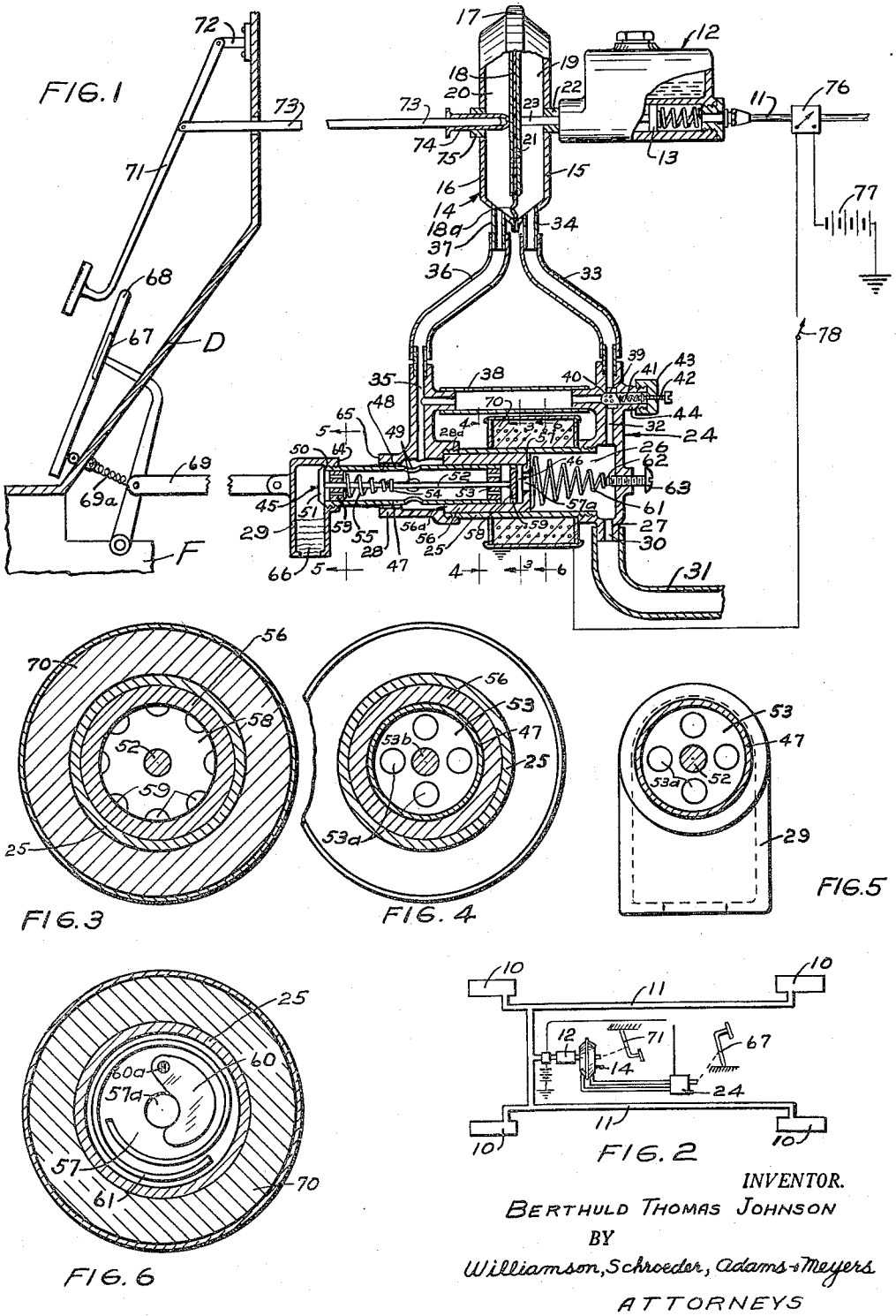
INVENTOR.
BERTHULD THOMAS JOHNSON
BY
Williamson, Schroeder, Adams & Meyers
ATTORNEYS ём
United States Patent Office 2,959,012
Patented Nov. 8, 1960

2,959,012

AUTOMOTIVE PULSATING BRAKE CONTROL APPARATUS

Berthuld Thomas Johnson, 1551 97th St., North Battleford, Saskatchewan, Canada

Filed Apr. 2, 1956, Ser. No. 575,469

2 Claims. (Cl. 60—54.6)

This invention relates to hydraulic pressure control mechanisms and more specifically relates to such mechanisms for applying braking forces to the wheels of an automotive-type vehicle.

It is well known that intermittent braking of automotive vehicle wheels is one of the most effective ways of stopping such a vehicle when traveling on a slippery roadway. In the past several different devices have been designed for causing intermittent operation of the wheel mechanisms but many of these devices have had numerous distinct disadvantages. One of the major disadvantages of such mechanisms is that, for the most part, they are complicated and intricate in construction and operation and are therefore unduly expensive.

Another distinct disadvantage of many of such devices is that they do not instantaneously release braking pressure when the foot control is released by the operator of the vehicle. A further disadvantage of some such devices is that they are not applicable to modern power brake mechanisms.

With these comments in mind it is to the elimination of these and other disadvantages to which my invention is directed along with the inclusion therein of other novel and desirable features.

An object of my invention is the provision of a new and improved hydraulic control mechanism of simple and inexpensive construction and operation for use in controlling hydraulic brake systems of automotive type vehicles and the like.

Another object of my invention is to provide novel apparatus for controllably applying intermittent braking pressure to the hydraulic braking system of an automotive vehicle in such a manner that the braking effect will be extremely efficient in stopping such a vehicle traveling on a slippery roadway.

Still another object of my invention is the provision in an automotive vehicle hydraulic braking system of control apparatus which may be adjusted to cause either intermittent or continuous braking pressure to be applied to the hydraulic braking system and which will vary the braking pressure applied in relation to the force exerted against the brake foot pedal by the operator.

A further object of my invention is to provide new and novel control apparatus for applying, when manually operated, intermittent braking pressure to the hydraulic brake control system and for instantaneously releasing, when the manual controls are released, the pressure in the brake control system.

A still further object of my invention is the provision of an improved control mechanism which is readily and easily applied to existing hydraulic systems in automotive vehicles and which may be used with most conventional types of systems.

A still further object of my invention is to provide a new and improved control apparatus for causing application of intermittent braking pressure to the hydraulic braking system of an automotive vehicle and which may be readily and easily adjusted to vary the rate at which the braking pressure is applied and released.

These and other objects and advantages of my invention will more fully appear from the following description made in connection with the accompanying drawings wherein like reference characters refer to similar parts throughout the several views and in which:

Fig. 1 is a diagrammatic view showing the invention in vertical cross section and showing other portions of an automotive vehicle attached thereto;

Fig. 2 is a diagrammatic view showing the hydraulic braking system of an automotive type vehicle with the present invention secured thereto;

Fig. 3 is a detail transverse section view taken on a substantially vertical plane as indicated at 3—3 of Fig. 1;

Fig. 4 is a detail transverse section view taken on a substantially vertical plane as indicated at 4—4 of Fig. 1;

Fig. 5 is a detail transverse section view taken on a substantially vertical plane as indicated at 5—5 in Fig. 1; and Fig. 6 is a detail transverse section view taken on a substantially vertical plane as indicated at 6—6 of Fig. 1.

One embodiment of the present invention is shown in the accompanying drawings and is described herein. As best seen in Fig. 2, the hydraulic braking system of an automotive type vehicle includes a number of brake cylinders 10 of conventional type which are all interconnected by hydraulic fluid flow lines 11 and are also connected by said flow lines to the pressure control mechanism or master cylinder 12 of the hydraulic braking system.

Means are provided for operating the piston 13 of the master cylinder 12 by utilizing a controlled air pressure differential and in the form shown, such means include a housing 14 defining an enlarged interior chamber and being constructed of a pair of opposed and interconnected saucer-shaped members or shell halves 15 and 16, which are joined together at their peripheral edges as by a removable band 17. A movable pressure-responsive element or diaphragm 18 is secured within the housing 14 between the peripheral edges of the saucer-shaped members 15 and 16 to define a pair of air pressure compartments 19 and 20. Diaphragm 18 may have enlarged stiffening plates 21 fixed to the opposite sides thereof and extending over a substantial portion of the area thereof. The peripheral edges 18a of diaphragm 18 are flexible to permit the diaphragm to move in one direction or the other toward the saucer-shaped shell halves 15 and 16.

In the form shown, the housing 14 is provided with a bushing 22 in one side thereof which may be threadedly secured in the end of master cylinder 12. Means are provided for connecting the diaphragm 18 with the pressure control mechanism or master cylinder 12 and in the form shown such means include a connecting rod 23 which is fixedly secured to the stiffening plate 21 of diaphragm 18 and which extends through bushing 22 for connection with the piston 13 of master cylinder 12. The diaphragm 18 and housing 14 are of substantially conventional construction and are supplied as a normal part of modern automobile brake systems.

A valve mechanism indicated in general by numeral 24 is provided for controlling the air flow into the chambers 19 and 20 on opposite sides of diaphragm 18. In the form shown, such valve mechanism includes a cylindrical body member 25 having an enlarged interior opening 26. The body of the valve mechanism 24 also includes end members 27 and 28 which are secured on the opposite ends of cylindrical body member 25 and also includes inlet housing 29. The body end member 27 is provided with a vacuum inlet opening 30 to which is connected an air flow tube 31 which will be connected to a source of vacuum air pressure, such as the intake manifold of the conventional automot've type engine. An outlet opening 32 is also formed in the body end member 27 and air conduit 33 is secured to the member 27 in air-communicating relation with outlet opening 32. Conduit 33 is connected at the other end to a nipple 34 on member 15 to provide air communicat'on with the interior compartment 19 therein. Air communication is thereby provided between the source of vacuum air pressure and the compartment 19 at all times.

End member 28 is provided with an outlet opening 35 therein. An air flow conduit 36 is fixedly secured to the end member 28 in a:r communication with outlet opening 35 and is also secured to a nipple 37 on member 16 of housing 14 to provide air communication with the interior compartment 20 thereof.

Pressure relief mechanism is provided between the compartments 19 and 20 by an air conduit 38 which is connected in a'r communication with outlet opening 35. The air conduit 38 is also adapted for air communication with outlet opening 32 when check valve 39 is operated. Check valve 39 is carried in body end member 27 for shifting movement into and out of air-sealing engagement with the seating port'on 40 formed in the outlet opening 32. The check valve element 39 has a hollow interior in which a compression spring 41 is mounted which bears against the inner end of check valve element 39 and against the inner end of an adjustment screw 42 which is threadably carried in a cap 43. Cap 43 is threadably secured to the boss 44 formed in body end member 27 for hold'ng check valve 39.

Valve mechanism 24 includes a pair of air valves indicated in general by numerals 45 and 46 which are interconnected for simultaneous operation to alternately and selectively connect the outlet opening 35 with the source of vacuum pressure through inlet opening 30 and the source of atmospheric air pressure through the inlet housing 29. In the form shown, a mount:ng sleeve 47 is slidably carried within the valve housing in a slide bearing 48 and has a plurality of enlarged apertures 49 formed in the central portion thereof. Check valve 45 includes an annular valve seat 50 formed at one end of sleeve 47 and also includes a valve element 51 which may have suitable gasket means thereon and which normally engages the valve seat 50 in air-sealing relation to preclude passage of air between the air inlet housing 29 and the interior of sleeve 48. Valve element 51 is fixedly secured to a connecting rod 52 which extends through sleeve 47. Means are provided in sleeve 47 for slidably carrying connecting rod 52 and in the form shown, slide mountings 53 are provided adjacent the opposite ends of sleeve 47 and may be fixedly secured therein. Slide mountings 53 are provided with suitable air flow apparatus 53a therethrough for permitting air passage through the length of sleeve 47 and are provided with centrally disposed bearing opening 53b for slidably carrying connecting rod 52 therein. An abutment element 54 is fixedly secured to connecting rod 52 and a compression spring 55 is disposed between one of the slide mountings 53 and the abutment element 54 for normally urging the valve element 51 into seating engagement with valve seat 50.

A core element 56 constructed of a magnetic material such as ferrous iron is substantially cylindrically shaped and is slidably mounted on sleeve 47 and in the open interior of cylindrical body member 25. Although it is desirable that an air-sealing relation exist between body member 25 and core element 56 and between core element 56 and sleeve 47, some leakage of air between these elements is permissible to facilitate ready and easy manufacture. The core element 56 is provided with an apertured end portion 57 which constitutes a valve seat or seating portion for air valve 46. The inner annular end surface 56a of magnetic core element 56 normally engages an annular abutment surface 28a on the interior of body member 28 and is thereby precluded from shifting inwardly. Magnetic core element 56 is free to shift away from abutment surface 28a. Control valve 46 also includes a valve or closure element 58 which is fixedly secured on the end of rod 52 opposite valve element 51. The peripheral edge portion of valve element 58 engages the interior peripheral surface of core element 56 and is provided with a plurality of air passages 59 therethrough for permitting flow of air between the apertured end portion 57 of core element 56 and the interior of sleeve 47. Valve element 58 is seatable against the seating portion 57 which may be provided with suitable gasket means. As best seen in Fig. 6, the apertured end 57 of core element 56 is prov'ded with an adjustable closure plate 60 which is swingably mounted thereon as by set screw 60a for movement across aperture 57a. Plate 60 may be shifted to partially close aperture 57a. Plate 60 may be shifted to partially close aperture 57a and set screw 60a will hold the plate in the desired position. By adjustment of plate 60 the frequency of intermittent application of hydraulic braking pressure in lines 11 and wheel cylinders 10 may be controlled. A compression spring 61 bears against the end 57 of magnetic core element 56 and against the inner end 62 of a set screw 63 which is threadably mounted in the body end member 27. Compression spring 61 is constructed to progressively exert more pressure upon core 56 as the spring is compressed. Air inlet housing 29 is secured on the end of sleeve 47 and provides an annular abutment surface 64 which is positioned to engage the opposed annular abutment surface 65 of body end member 28 for restricting sliding movement of sleeve 47. Air inlet housing 29 has a quantity of air-filtering material such as steel wool 66 therein.

Manual control means are provided for sliding sleeve 47 in a longitudinal direction and in the form shown such means include an auxiliary brake pedal 67 which is swingably mounted on the automobile frame F and which is positioned closely adjacent the accelerator pedal 68. Auxiliary brake pedal 67 is swingably connected by a suitable linkage 69 to the inlet housing 29. Resiliently yieldable means are provided for returning sleeve 47 and auxiliary brake pedal 67 to their normal positions and in the form shown, spring 69a is connected with brake pedal 67 and with the dash D of the automobile for returing the brake pedal 67 to itis normal position shown.

Electromagnetic means are also provided for operating the valvese 45 and 46 and for moving the magnetic core element 56 away from valve element 58 and sleeve 47. In the form shown an electromagnet 70 is mounted on the body member 25 in surrounding relation therewith. Electromagnet 70 is positioned to pull magnetic core element 56 against spring 61 and away from valve element 58.

Control means are provided for controlling the operation of electromagnet 70 and in the form shown, a hydraulic pressure-responsive electric switch 76 is connected in the hydraulic fluid flow line 11 to be operated by the hydraulic pressure therein. The switch 76 is normally open and is closed upon application of hydraulic pressure in the hydraulic fluid flow line 11 and is again reopened when hydraulic fluid pressure is decreased. Switch 76 is connected with a source of electric power as indicated by battery 77 and is also connected with a manual control switch 78 which may be physically located on the dash control panel of the automobile vehicle. Switch 76 and switch 78 are connected with the electromagnet 70 for controlling the same.

The brake control apparatus herein described may be used with a conventional brake pedal 71 which is swingably secured to a bracelet 72 which may be fixedly secured to the dash D of the vehicle. A rod 73 is swingably connected with the brake pedal arm 71 for moving the piston 13 of the master cylinder 12. In the form shown, a sheath 74 is carried in a slide bushing 75 in the diaphragm housing 14 and is positioned to engage the diaphragm 18 opposite the connecting rod 23. Rod 73 is slidably carried within sheath 74 for moving the same. It should be noted that the manner in which the conventional brake pedal arm 71 is connected to the master cylinder is not critical with the exception that the brake pedal 71 and the diaphragm controlling mechanism for master cylinder 12 are adapted to work independently of each other. The diaphragm housing 14 and master cylinder 12 may be suitably mounted on the dash D of the vehicle or may be otherwise suitably fixed to the automobile frame.

*Operation*

In operation, the conventional brake control 71 may be operated to operate the hydraulic braking system in the conventional manner. The rod 73 will slide into sheath 74 which will thereupon slide inwardly of housing 14 and urge the connecting rod to the right so as to move master cylinder piston 13 and thereby increase the hydraulic fluid pressure in flow line 11. The wheel cylinders 10 will thereupon be braked in the conventional manner.

The operation of auxiliary brake pedal 67 is entirely independent from the operation of brake control 71. First assume that the manual switch control 78 is opened so as to maintain electromagnet 70 deenergized and to render pressure-responsive switch 76 ineffective for controlling electromagnet 70. It should also be noted that compression spring 61 is substantially stronger than coil spring 55 so that coil spring 55 will yield before spring 61 yields.

Before the brake pedal 67 is operated, the source of vacuum air pressure is connected through pipe 31 to both sides of diaphragm 18 or to both compartments 19 and 20 defined within the diaphragm housing 14. The compartment 19 is always directly connected with the source of vacuum air pressure through the inlet opening 30, the interior opening 26 of the body end member 27, outlet opening 32, air conduit 33 and nipple 54. The compartment 20 is initially and normally connected with the source of vacuum air pressure through the vacuum inlet opening 30, the aperture 57a of magnetic core element 56, the opening 59 in the periphery of valve element 58, the hollow interior of sleeve 47 and the apertures 49 therein, outlet opening 35, air conduit 36 and nipple 37. Because vacuum air pressure is normally maintained on both sides of diaphragm 18, there is no air pressure tending to exert force against diaphragm 18 and therefore the diaphragm will remain stationary.

If auxiliary brake pedal 67 is depressed, the inlet housing 29 will be shifted inwardly by the linkage 69 and will cause sleeve 47 to shift inwardly toward magnetic core element 56. As sleeve 47 moves inwardly or toward the right, valve elements 51 and 58 are carried therewith. Valve element 58 will subsequently engage the seating portion 57 of magnetic core element 56 and will close the air passage or aperture 57a and a preclude air communication therethrough. Magnetic core element 56 will remain substantially stationary, and as sleeve 47 continues to move inwardly, due to the influence of manual pressure exerted against brake pedal 67, valve element 58 will hold valve element 51 substantially stationary and the valve seat 50 will shift away from valve element 51. The opening of air valve 45 will thereby occur substantially simultaneously with the closing of air valve 46. When air valve 45 opens, air communication is provided between the air inlet housing 29 and the compartment 20 in diaphragm housing 14. Because atmospheric air pressure exists in compartment 20 and vacuum air pressure exists in compartment 19, diaphragm 18 will be shifted to the right to cause connecting rod 23 to be projected inwardly of master cylinder 12 and thereby cause movement of piston 13 to increase the hydraulic fluid pressure in the brake control system including flow line 11. Pressure responsive switch 76 will close, but has no effect because as previously assumed manual control switch 78 is open. Braking pressure is thereupon applied to the wheel cylinders 10.

When air valve 45 is opened, an air pressure differential is created on opposite ends of core 56, tending to urge the core to the right, and spring 61 urges core 56 to the left. Spring 61 permits slight movement of core 56 to the right which causes valve 45 to close. When valve 45 closes, the air pressure differential on core 56 is reduced, and spring 61 moves core 56 to the left, and causes valve 45 to open again. When valve 45 opens the air pressure differential across core 56 is again created and core 56 is moved again. In this manner core 56 is caused to oscillate slightly to maintain the air pressure in compartment 20 of the diaphragm housing at a level which is proportional to the movement of brake pedal 67. If the brake pedal 67 is pressed nearly all the way down, sleeve 47 and core 56 are moved to the right sufficiently so that spring 61 exerts a high pressure against core 56. When this occurs, a high air pressure differential across core 56 is necessary before the core is moved to the right under the influence of the air pressure. This high pressure is applied to compartment 20 to move the diaphragm, and core 56 will oscillate slightly to maintain this pressure at a substantially constant level as previously described.

It will be seen that the tension of spring 61 controls the pressure-relieving oscillation of core 56 and therefore controls the amount of air pressure applied in chamber 20 and against diaphragm 18 for a given movement of brake pedal 67. The tension of spring 61 may be adjusted by adjusting the screw 63. When screw 63 is turned inwardly, tension on spring 61 is increased and less movement of brake pedal 67 is required to produce a certain braking pressure in compartment 20.

When manual control switch 78 is open, the hydraulic braking pressure created in conduits 11 and wheel cylinders 10 is continuous due to the depressing of brake pedal 67. The necessary pressure applied to brake pedal 67 is very slight as compared to the force which must normally be exerted against a conventional brake pedal such as 71 in an automotive vehicle.

To obtain pulsing or intermittent application of hydraulic fluid pressure in the conduits 11 and the wheel cylinders 10 when auxiliary brake pedal 67 is depressed, the manual switch 78 must be closed. If the switch 78 is closed when the brake pedal 67 is depressed, the operation of the valve mechanism will be identical to that previously described until hydraulic fluid braking pressure is created in the fluid conduits 11 to cause operation of the pressure-responsive electric switch 76. It will be remembered that the application of hydraulic fluid pressure is caused by the operation of diaphragm 18 which resulted from the closing of air valve 46 and the opening of air valve 45. It will also be remembered that sleeve 47 has been shifted to the right and because spring 61 is stronger than spring 55, the magnetic core element 56 remains substantially stationary and the spring 55 yields to permit relative movement between valve element 51 and sleeve 47.

When hydraulic fluid pressure is created in fluid conduit 11, pressure switch 76 closes and causes energization of the electromagnet 70. Electromagnet 70 exerts force upon the magnetic core element 56 and tends to move the same to the right, or away from sleeve 47 and valve element 58. Electromagnet 70 has sufficient strength together with the air differential acting on core 56 to overcome the influence of coil spring 61 and therefore the magnetic core element 56 is moved to the right to cause the seating portion 57 of the valve element 46 to disengage from valve element 58 and to thereby open valve 46 for air communication therethrough. As seating portion 57 disengages the valve element 58, valve element 58 is permitted to move slightly to the right relative to sleeve 47 due to the influence of spring 55 to thereby cause valve element 51 to be seated in air-sealing relation upon valve seat 50 to cause closing of air valve 45. Air communication between air inlet housing 29 and outlet 35 is thereby precluded and air communication between vacuum inlet opening 30 and outlet 35 is permitted. When valve 46 opens vacuum air pressure is again applied to both sides of diaphragm 18 in compartments 19 and 20 and the diaphragm 18 moves back to the normal position shown to retract the master cylinder piston 13 and release the hydraulic fluid pressure in conduit 11. It should be pointed out that from the closing of pressure-responsive switch 76 to the subsequent releasing of hydraulic fluid pressure in conduit 11 due to the operation of valve 46, only a short period of time, approximately a fraction of a second has elapsed. The time is controlled primarily by the size of the opening 57a in magnetic core element 56 which may be adjusted by the closure plate 60.

When the hydraulic fluid pressure has been relieved in conduit 11 due to the reopening of valve 46 and the reclosing of valve 45, the pressure responsive switch 76 reopens to cause de-energization of electromagnet 70. When electromagnet 70 is de-energized, magnetic core element 56 is shifted by spring 61 to the left and into engagement with valve element 58. Because sleeve 47 and valve seat 50 are being held in substantially stationary position by manual pressure exerted through brake pedal 67, pressure exerted against valve element 58 by the seating portion 57 will cause the valve element 58 to move relative to sleeve 47 and cause a corresponding movement of valve element 51 which thereby opens the valve 45. Air communication is thereby again permitted between the air inlet housing 29 and outlet 35 to create a pressure differential between compartments 19 and 20. As previously described this pressure differential causes operation of diaphragm 18 which results in an increased hydraulic pressure in conduit 11 of the braking system. This increase in hydraulic fluid pressure again closes pressure-responsive switch 76 which operates electromagnet 70 as previously described to reopen valve 46 and reclose valve 45. It will be seen that as the hydraulic pressure in conduit 11 is increased the electromagnet 70 is operated to cause operation of valves 45 and 46. An oscillation is set up in the hydraulic fluid pressure in conduit 11 and the pressure-responsive switch 76 will alternately open and close and the magnetic core element 56 will reciprocate toward and away from valve element 58. This results in the pulsing or application of intermittent hydraulic pressure of the hydraulic braking system.

Because of this intermittent application of and releasing of hydraulic braking pressure in the wheel cylinders 10, the braking effect upon the automotive wheels will be intermittent and braking effect will be at a maximum. When only slight manual force is exerted against the brake pedal 67, the braking of the wheels will be relatively slight because the hydraulic fluid pressure will be at a low value relative to the maximum possible hydraulic pressure. If the brake element 67 is moved to the maximum extent braking effect will be markedly increased because the hydraulic fluid pressure during each pulse will be substantially greater.

When manual force is removed from brake pedal 67 sleeve 47 will return substantially to the position shown and the valve 45 will be closed by the shifting of valve seat 50 into engagement with valve element 51. Valve element 51 will carry valve element 58 to the left therewith to cause opening of valve 46. Braking pressure in fluid conduit 11 is relieved substantially instantaneously due to the equalization of air pressures on opposite sides of diaphragm 18 in compartments 19 and 20. There is no appreciable delay between the release of foot pedal 67 and the removal of hydraulic braking pressure in the hydraulic brake system.

If it is desired to change the rate at which the hydraulic fluid braking pressure in the brake system is applied and released, the adjusting plate 60 will be moved so as to change the size of aperture 57a in the seating portion 57 of magnetic core element 56. This will cause a change of air flow through valve 46 when the same is opened and will change the time required for equalizing the pressures in compartments 19 and 20 of diaphragm housing 14. The frequency at which the hydraulic braking pressure pulses will thereby be changed.

By moving the adjustment screw 63 to change the tension on compression spring 61, the manner in which the magnetic core element 56 is permitted to move will be changed so as to increase or decrease the rate of movement thereof. The rate at which the hydraulic pressure in the hydraulic braking pressure pulses will thereby be changed.

The tension on the check valve 39 is adjusted so as to by-pass a portion of the air pressure when the brake pedal 69 is suddenly fully depressed so as to prevent skidding of the vehicle wheels on dry roadway surfaces such as asphalt and concrete.

It will be seen that I have provided a new and improved brake control apparatus which will either intermittently or continuously apply a hydraulic braking pressure in the automotive braking system in proportion to the manual force exerted against the brake pedal and which will instantaneously release the braking pressure applied in the braking system when manual force is removed from the brake pedal.

It should also be apparent that I have provided a new and novel brake control apparatus for causing intermittent application of hydraulic braking pressure in the brake system, which is easily manufactured, and easily and readily applied to existing brake mechanisms of an automotive vehicle.

It will, of course, be understood that various changes may be made in the form, detail, arrangement and proportion of the parts without departing from the scope of my invention which consists of the matter described herein and set forth in the appended claims.

What I claim is:

1. Brake control apparatus for operating the hydraulic pressure control means of a hydraulic brake system, said apparatus including means defining an air pressure chamber, a pressure-responsive element movably mounted in said chamber and defining first and second air pressure compartments therein, and said pressure-responsive element having means connected with the pressure control means of the brake system for operating the same and increasing the hydraulic pressure in the system when the fluid pressure in said first compartment exceeds the pressure in the second compartment, valve means having an outlet and also having a first inlet and a second inlet, said valve means being constructed and arranged for interchangeably and selectively connecting said outlet with said inlets and normally providing fluid flow communication between said first inlet and said outlet, a source of atmospheric air pressure, a source of vacuum pressure, said valve outlet being connected in fluid flow communicating relation with said first compartment means continuously connecting said source of vacuum pressure in fluid flow communicating relation with said second compartment and also with said first inlet whereby to normally equalize air pressure on opposite sides of the pressure responsive element, means connecting said source of atmospheric air pressure to said second inlet, manually operated control means connected with said valve means for operating the same and connecting said second inlet with said outlet whereby to apply atmospheric pressure to said first compartment to move said pressure responsive element, an operable and releasable electric valve-operating means connected with said valve means and, when operated, superseding the controlling influence of said manually operated control means and causing the valve means to return to normal flow-controlling condition wherein fluid flow communication is provided between said first inlet and said outlet, and said electric valve operating means, when released, withdrawing its controlling influence on the valve means and thereby permit the manually operated control means to resume controlling influence on the valve means to permit the valve means to provide fluid flow communication between said second inlet and said outlet, and pressure-responsive electric control means connected with the electric valve operating means and with the hydraulic brake system and operating in response to increased pressure in said system to cause operation of the electric valve operating means and also operating in response to normal pressure in said system to release said electric valve operating means, whereby operation of said manually operated control means initiates cyclic and intermittent application and removal of hydraulic pressure to the brake control system.

2. Brake control apparatus for operating the control means of a hydraulic brake system, said apparatus including chamber-defining means, a flexible diaphragm secured in said chamber and defining first and second air pressure compartments therein, means connecting the diaphragm to the pressure control means of the brake system for operating the same and causing an increase in hydraulic pressure in the system when the pressure in said first compartment exceeds the pressure in said second compartment, operable valve means having an outlet and also having a vacuum inlet and an air inlet, said outlet being connected to said first pressure compartment, a source of vacuum pressure connected with said second compartment and also connected to said vacuum inlet, said air inlet communicating with atmospheric air, said valve means being normally biased to connect said vacuum inlet with said outlet and thereby cause application of equalized pressures in said first and second compartments, and said valve means being constructed to interchangeably connect said inlets with said outlet, manually operated means connected with said valve means for operating the same to connect the air inlet with the outlet and thereby cause pressure in said first compartment to exceed the pressure in said second compartment to cause an increase of the hydraulic pressure in the brake system, operable and releasable electric valve operating means connected with said valve means and, when operated, superceding the controlling influence of said manually operated means and causing said valve means to provide fluid flow communication between said vacuum inlet and said outlet whereby to again equalize pressures on opposite sides of the diaphragm for causing the hydraulic pressure in the brake system to return to normal, and said electric valve operating means, when released, withdrawing its controlling influence on the valve means to permit the valve means to return, under influence of the manually operated mechanism to provide fluid flow communication between said air inlet and said outlet, and hydraulic pressure-responsive switch means connected with the hydraulic brake system and also connected with the electrical valve operating means and operating said electrical valve operating means in response to an increased hydraulic fluid pressure in the brake system, and also operating in response to normal pressure in said system to release said electrical valve operating means, whereby operation of said manually operated means initiates cyclic and intermittent application and removal of increased hydraulic pressure in the hydraulic brake system.

References Cited in the file of this patent
UNITED STATES PATENTS

| | | |
|---|---|---|
| 1,731,041 | Bragg et al. | Oct. 8, 1929 |
| 1,972,330 | Davis | Sept. 4, 1934 |
| 2,218,191 | Dick | Oct. 15, 1940 |
| 2,270,585 | Gartner | Jan. 20, 1942 |
| 2,323,208 | Eaton | June 29, 1943 |
| 2,477,468 | Shelton | July 26, 1949 |
| 2,747,697 | Banker | May 29, 1956 |